United States Patent
Lee et al.

(10) Patent No.: US 10,849,058 B2
(45) Date of Patent: Nov. 24, 2020

(54) METHOD AND APPARATUS FOR TRANSMITTING AND RECEIVING DATA IN A WIRELESS COMMUNICATION SYSTEM

(71) Applicant: LG ELECTRONICS INC., Seoul (KR)

(72) Inventors: Ki-Dong Lee, San Diego, CA (US); Sanggook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/347,122

(22) PCT Filed: Nov. 3, 2017

(86) PCT No.: PCT/KR2017/012431
§ 371 (c)(1),
(2) Date: May 11, 2018

(87) PCT Pub. No.: WO2018/084646
PCT Pub. Date: May 11, 2018

(65) Prior Publication Data
US 2019/0281523 A1 Sep. 12, 2019

Related U.S. Application Data

(60) Provisional application No. 62/417,280, filed on Nov. 3, 2016.

(51) Int. Cl.
*H04W 48/18* (2009.01)
*H04W 36/00* (2009.01)
*H04W 36/14* (2009.01)
*H04W 36/30* (2009.01)
*H04W 4/00* (2018.01)
(Continued)

(52) U.S. Cl.
CPC ............. *H04W 48/18* (2013.01); *H04W 4/00* (2013.01); *H04W 4/02* (2013.01);
(Continued)

(58) Field of Classification Search
CPC . H04W 24/08; H04W 36/0044; H04W 36/08; H04W 36/14; H04W 36/30;
(Continued)

(56) References Cited

U.S. PATENT DOCUMENTS 6,529,491 B1 3/2003 Chang et al.
2005/0153722 A1 7/2005 Chou et al.
(Continued)

OTHER PUBLICATIONS

Maurizio A. Bonuccelli et al., Scheduling of Real Time Messages in Optical Broadcast-and-Select Networks, In: IEEE/ACM Transactions on Networking, vol. 9, Issue: 5, pp. 541-552, Oct. 2001.

*Primary Examiner* — Kevin C. Harper
(74) *Attorney, Agent, or Firm* — Dentons US LLP

(57) ABSTRACT

Disclosed herein is a method for providing a specific service through a wireless networks by a terminal. The method performed by a terminal comprises receiving broadcasting information from a primary network or a secondary network, determining a first wireless network among at least one available wireless network mapped to the specific service according to the priority information, and providing the specific service through the determined first wireless network.

10 Claims, 13 Drawing Sheets

(51) Int. Cl.
*H04W 4/02* (2018.01)
*H04W 88/06* (2009.01)

(52) U.S. Cl.
CPC ... *H04W 36/0007* (2018.08); *H04W 36/0069* (2018.08); *H04W 36/14* (2013.01); *H04W 36/30* (2013.01); *H04W 88/06* (2013.01)

(58) Field of Classification Search
CPC ............ H04W 48/18; H04W 36/0007; H04W 36/0069; H04W 4/00; H04W 4/02; H04W 88/06
See application file for complete search history.

(56) References Cited

U.S. PATENT DOCUMENTS

| | | | |
|---|---|---|---|
| 2008/0090573 A1* | 4/2008 | Kim | H04W 36/08 455/436 |
| 2010/0290430 A1* | 11/2010 | Lee | H04W 36/385 370/331 |
| 2011/0310851 A1* | 12/2011 | Klingenbrunn | H04L 47/2491 370/332 |
| 2011/0320588 A1* | 12/2011 | Raleigh | H04W 36/245 709/224 |
| 2013/0258870 A1* | 10/2013 | Macias | H04W 48/18 370/252 |
| 2014/0219088 A1* | 8/2014 | Oyman | H04N 21/23439 370/231 |
| 2016/0014721 A1 | 1/2016 | Kim et al. | |
| 2016/0057729 A1* | 2/2016 | Horn | H04W 48/18 455/458 |
| 2016/0156723 A1 | 6/2016 | Seo et al. | |
| 2016/0345341 A1* | 11/2016 | Oliver | H04W 4/029 |

* cited by examiner

[Figure 1]
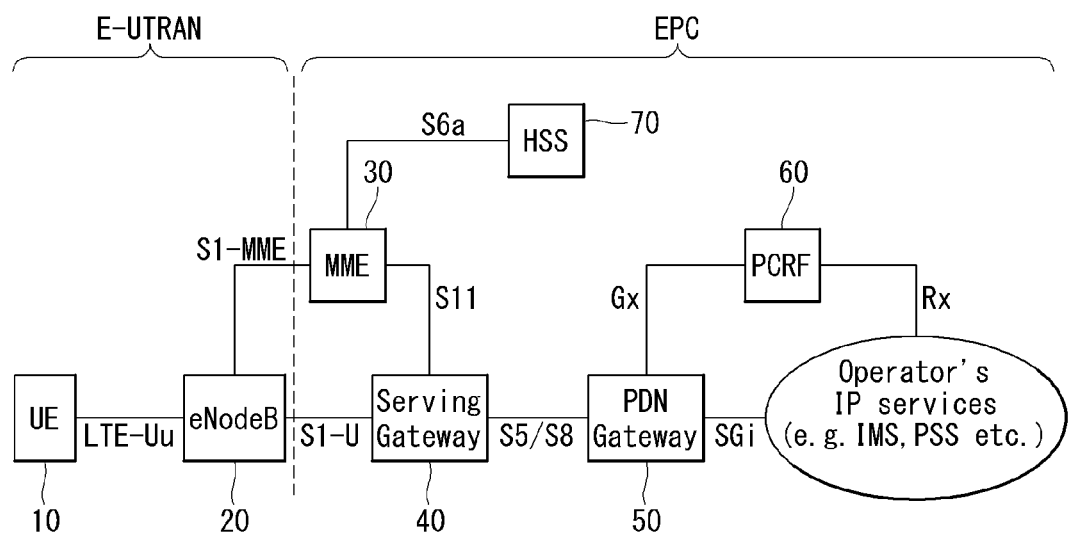

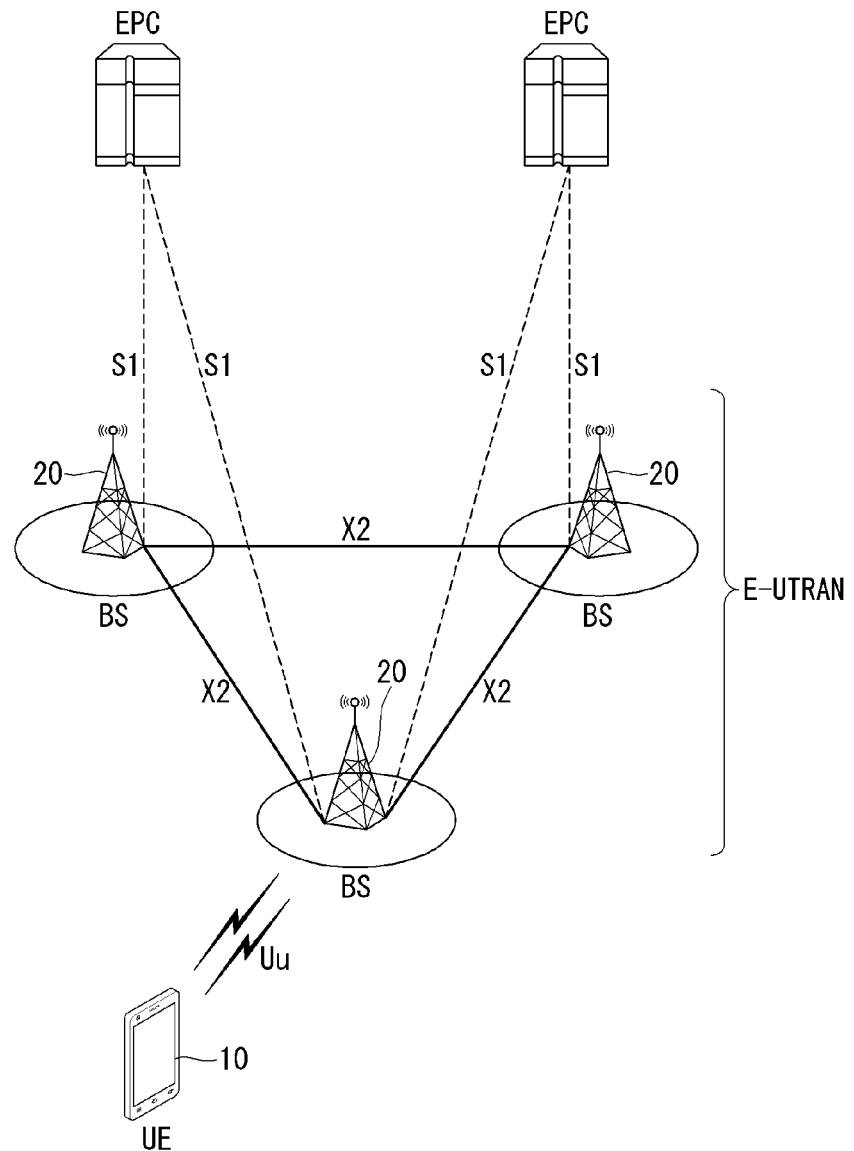
[Figure 2]

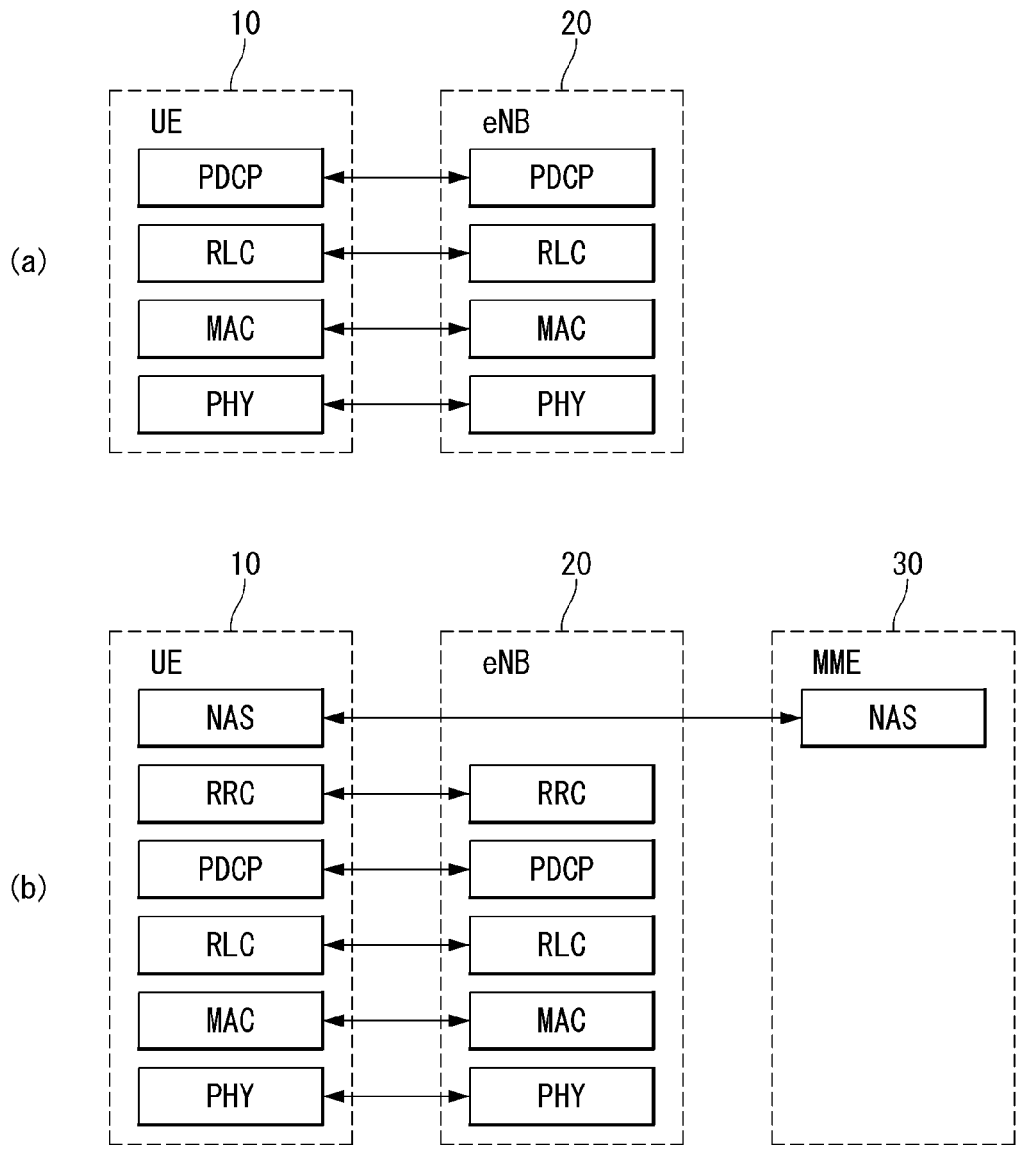
[Figure 3]

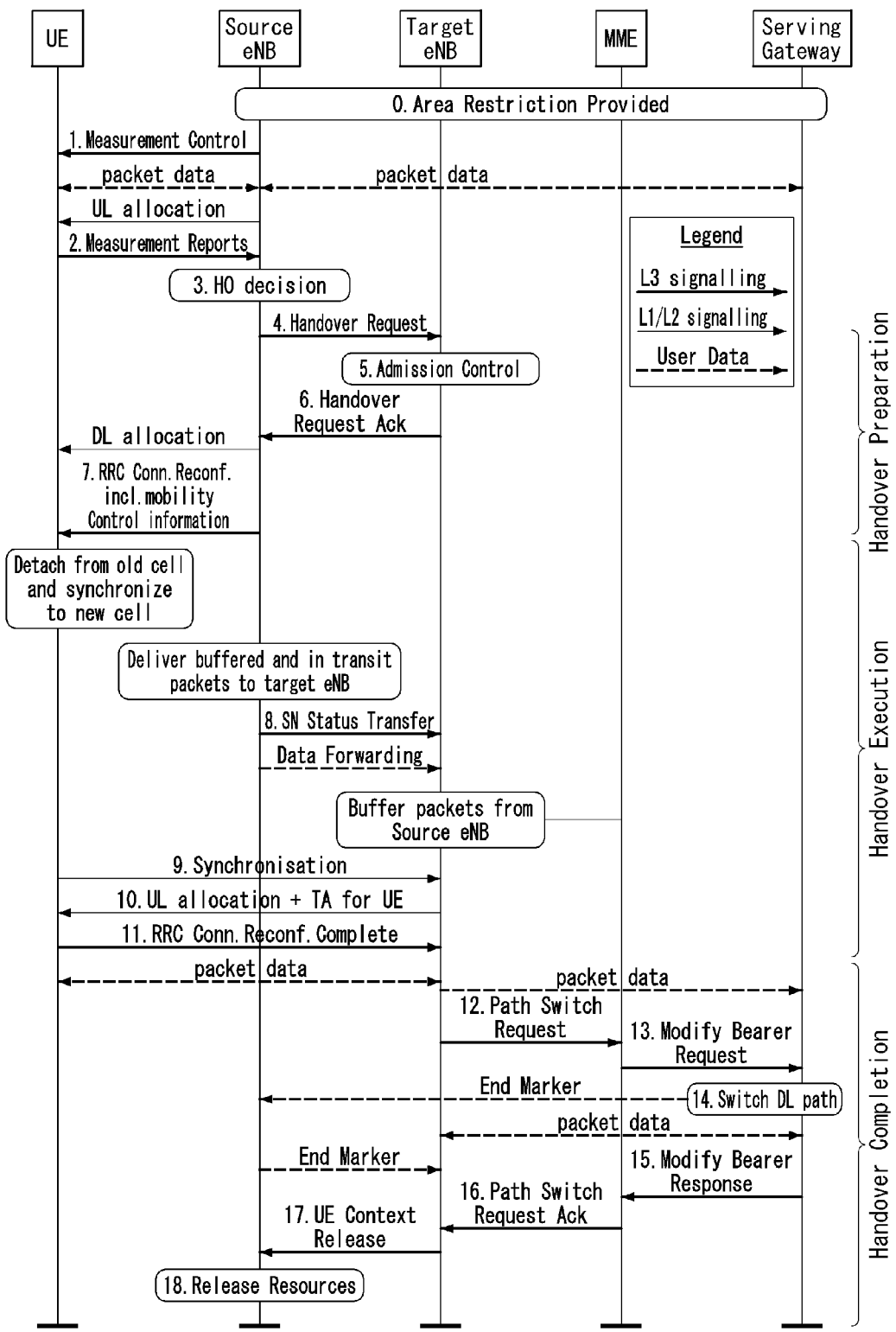

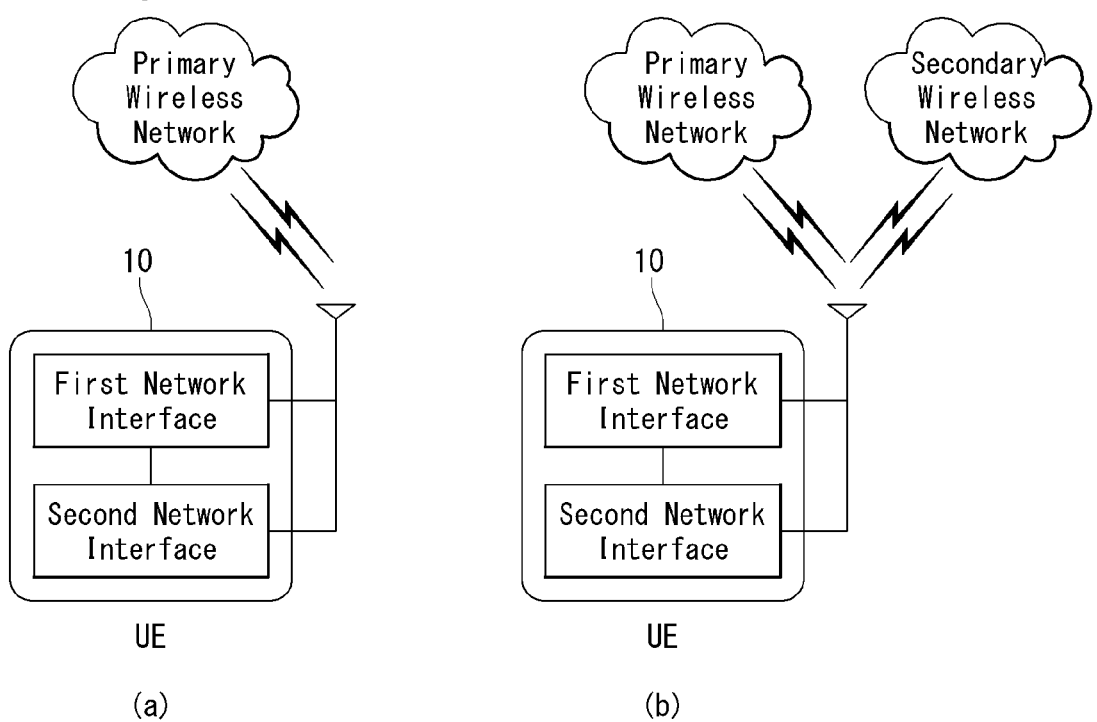
[Figure 5]

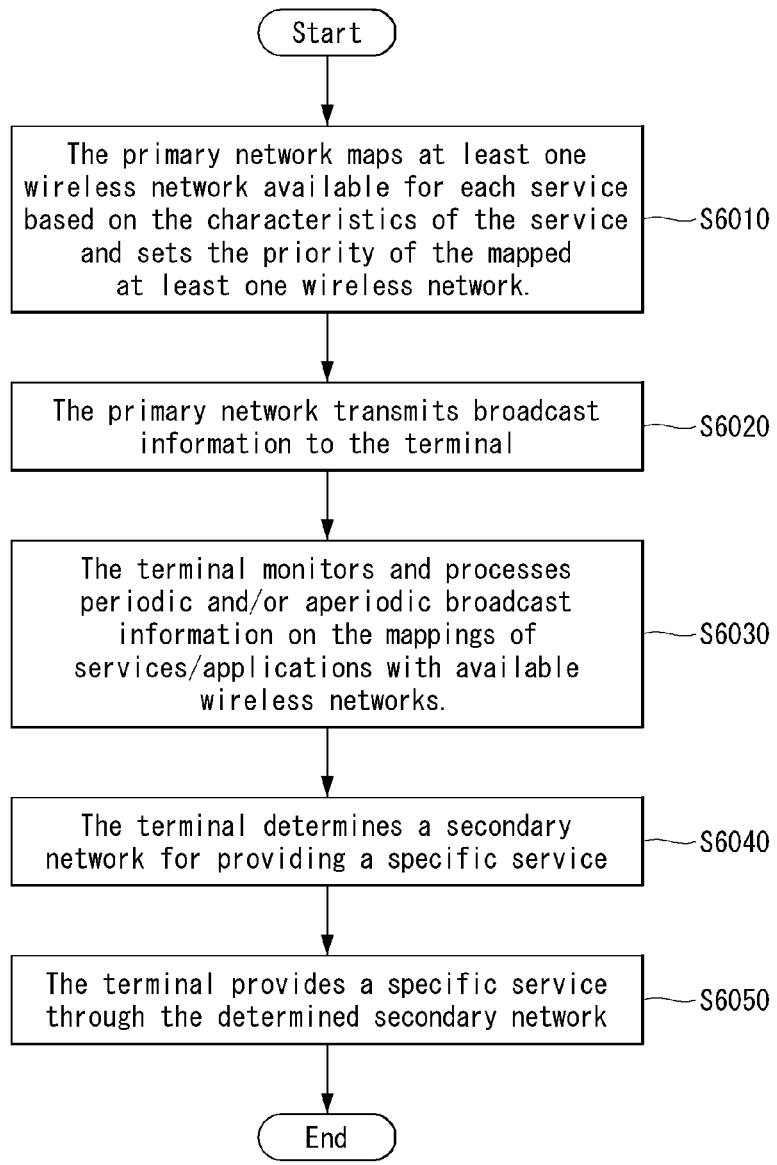
[Figure 6]

[Figure 7]
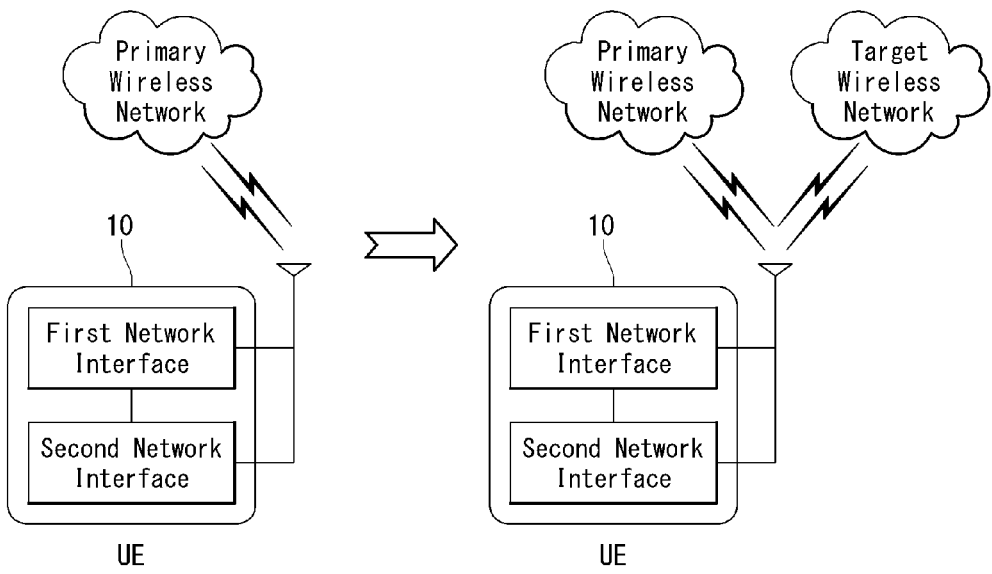
(a)
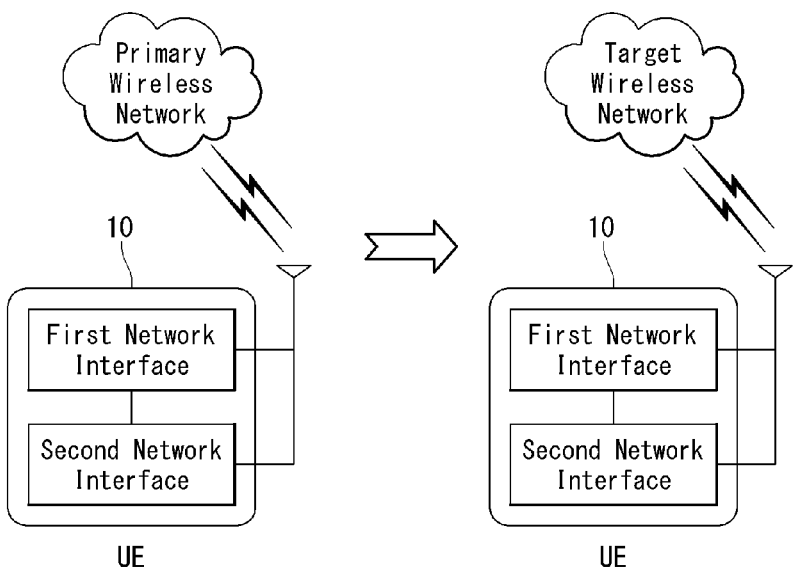
(b)

[Figure 8]
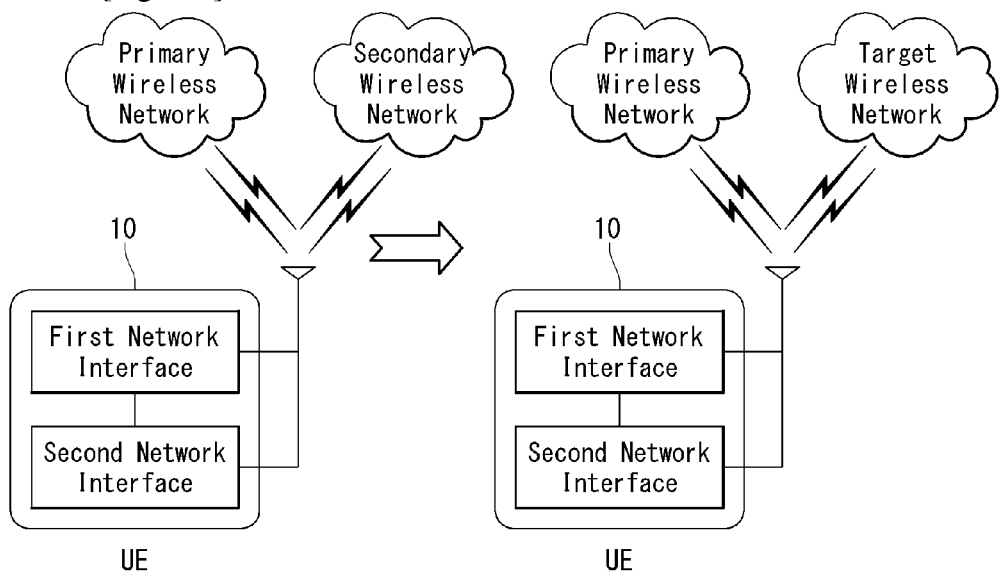
(a)
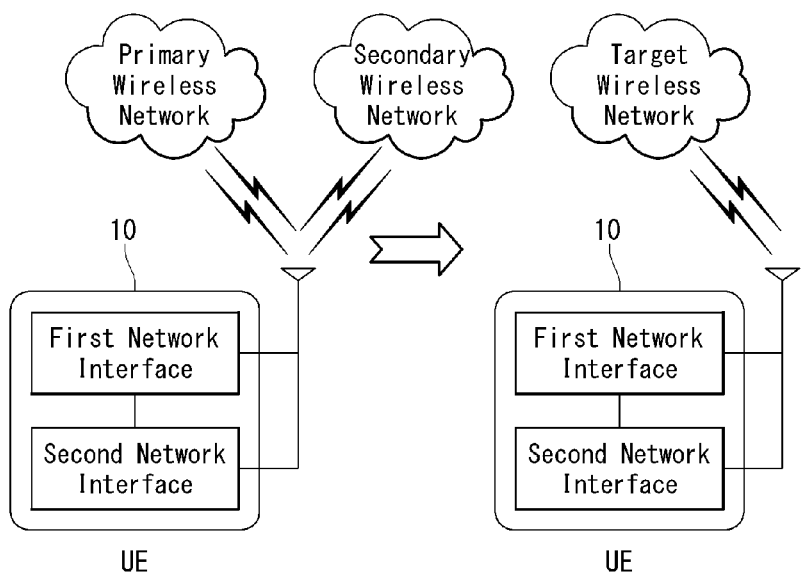
(b)

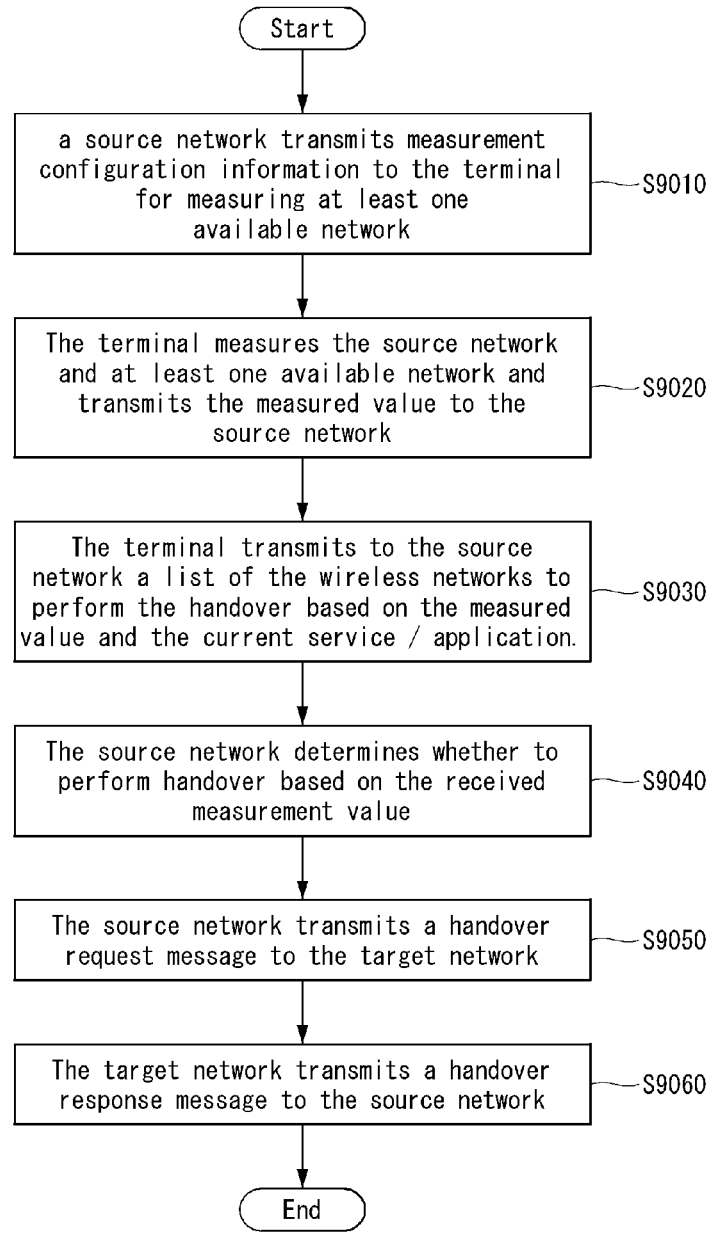
[Figure 9]

[Figure 10]
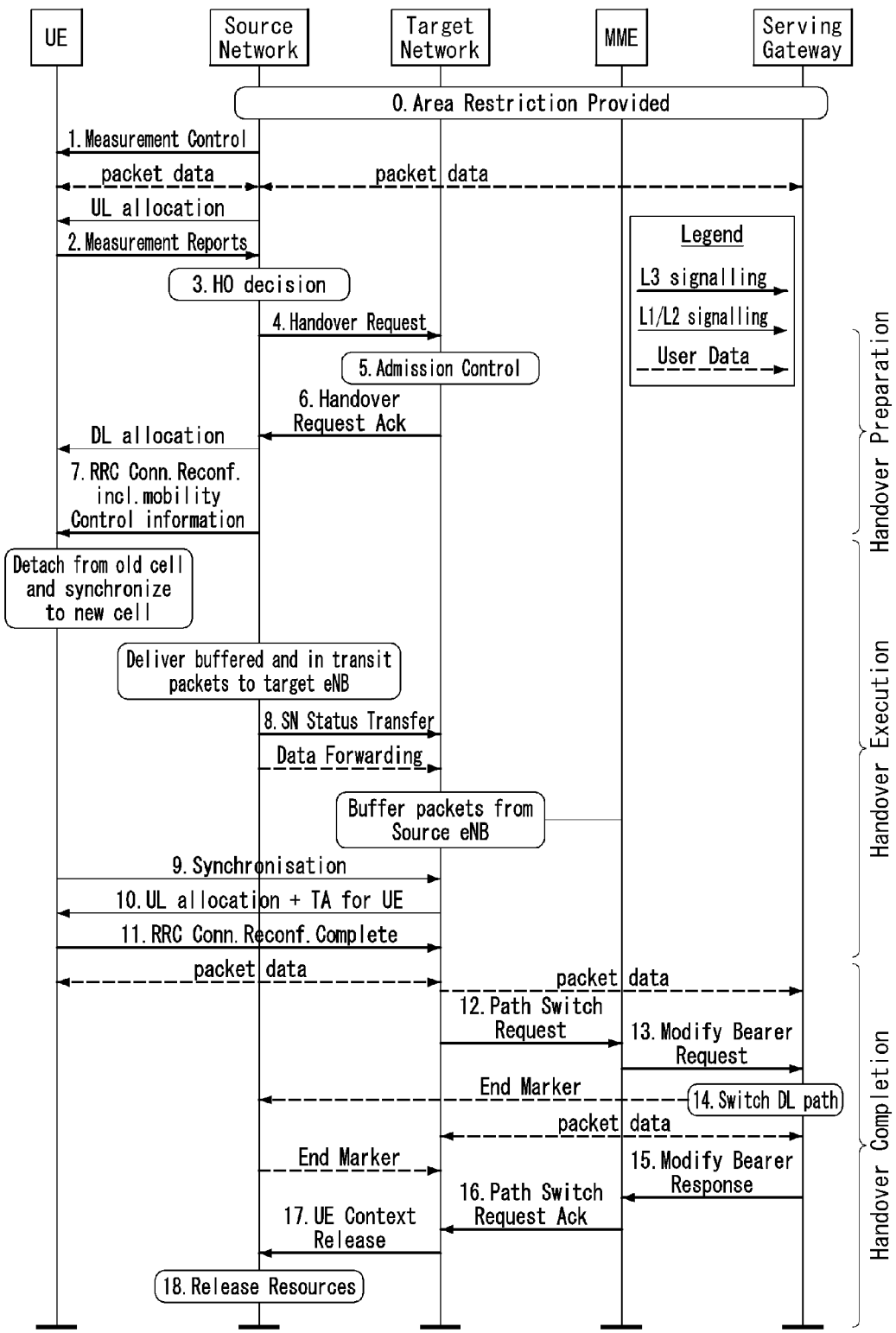

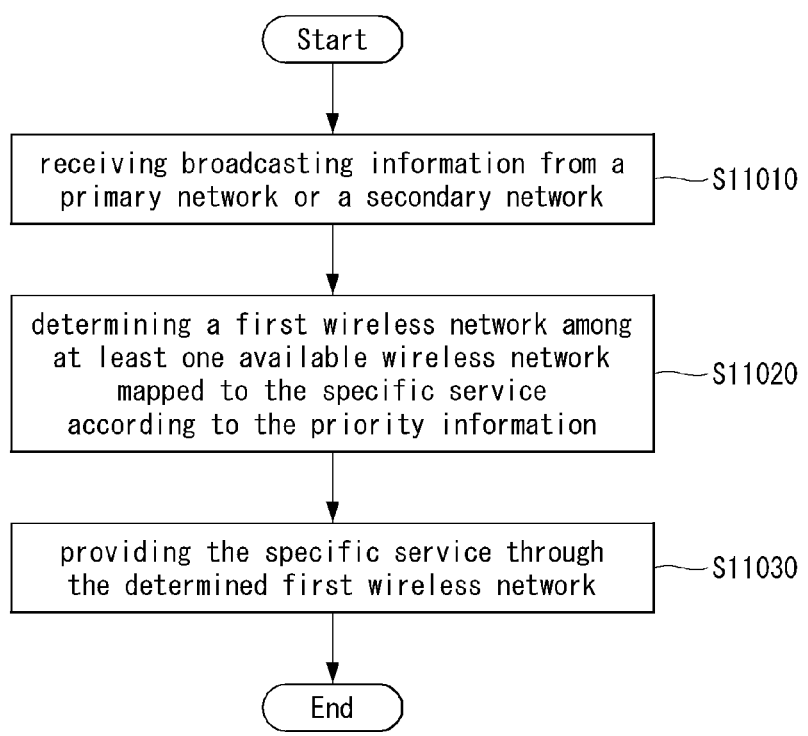
[Figure 11]

[Figure 12]
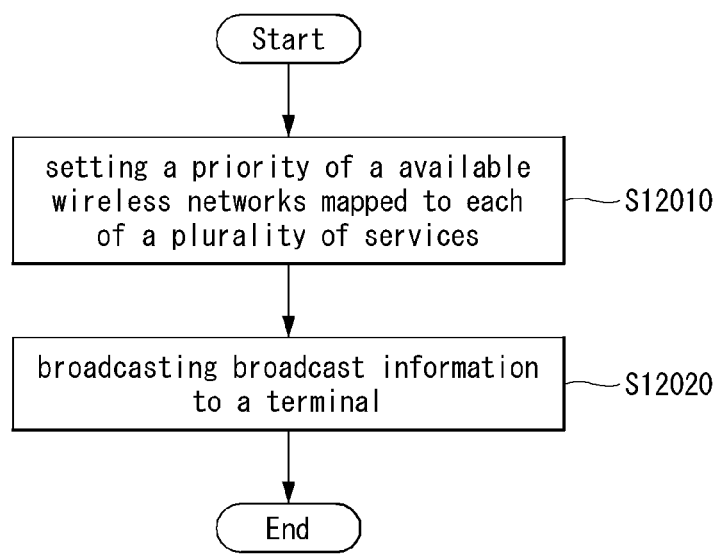

[Figure 13]
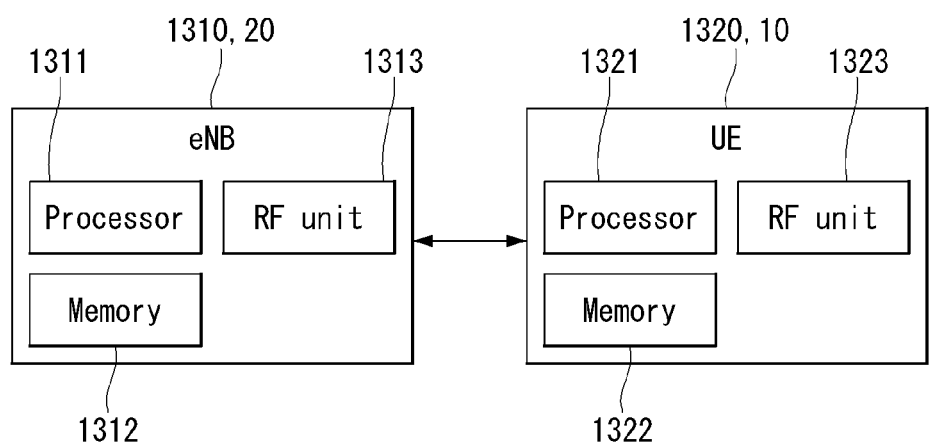

METHOD AND APPARATUS FOR TRANSMITTING AND RECEIVING DATA IN A WIRELESS COMMUNICATION SYSTEM

CROSS-REFERENCE TO RELATED APPLICATIONS

This application is the National Stage filing under 35 U.S.C. 371 of International Application No. PCT/KR2017/012431, filed on Nov. 3, 2017, which claims the benefit of U.S. Provisional Application No. 62/417,280, filed on Nov. 3, 2016, the contents of which are all hereby incorporated by reference herein in their entirety.

TECHNICAL FIELD

The present invention relates to a method of transmitting and receiving data of a terminal in a wireless communication system, and more particularly, to a method and apparatus for transmitting and receiving data using different wireless networks according to a service.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

The present invention provides a method and apparatus for transmitting and receiving data by selecting a wireless network according to a service.

Further, the present invention provides a method and apparatus for mapping an available wireless network to each category by classifying services into categories according to characteristics of a service in an environment in which a plurality of networks exist.

Further, the present invention provides a method and apparatus for setting a priority of mapped wireless networks and providing a service through a wireless network according to the preset priority.

Further, the present invention provides a method and apparatus for handover to an available another wireless network, when a connected network can no longer provide a service according to a movement of a terminal.

Objects to be achieved in this specification are not limited to the aforementioned advantages, and those skilled in the art to which the present invention pertains may evidently understand other objects from the following description.

Technical Solution

In this specification, A method for providing a specific service through a wireless networks by a terminal, the method comprising: receiving broadcasting information from a primary network or a secondary network, wherein the broadcasting information includes at least one of mapping information indicating a mapping relationship between a plurality of services and available wireless networks, configuration information of the available wireless networks or priority information of the available wireless networks mapped to each of the plurality of services; determining a first wireless network among at least one available wireless network mapped to the specific service according to the priority information; and providing the specific service through the determined first wireless network, wherein the priority information is determined according to characteristics of the each service.

Furthermore, in this specification, the characteristics include at least one of a transmission rate, reliability or latency required to provide the specific service.

Furthermore, in this specification, the broadcasting information is changed according to a location of the terminal, a traffic load of the network, or time.

Furthermore, in this specification, the method further comprises performing a handover to a target wireless network included in the at least one available wireless network, when the first wireless network is unable to provide the specific service.

Furthermore, in this specification, the method further comprises receiving measurement configuration information for measuring channel quality of the target wireless network from the first wireless network, wherein the measurement configuration information includes at least one of a channel parameters related to the at least one available wireless networks for handover.

Furthermore, in this specification, the step of performing a handover further comprises measuring channel quality of the target wireless network, and reporting the measured channel quality to the first wireless network.

Furthermore, in this specification, the primary network performs a function of controlling the terminal.

Furthermore, in this specification, A method for providing a specific service through a wireless networks by a source network, the method comprising setting a priority of available wireless networks mapped to each of a plurality of services; transmitting broadcasting information to a terminal, wherein the broadcasting information includes at least one of mapping information indicating a mapping relationship between the plurality of services and the available wireless networks, configuration information of the available wireless networks or priority information indicating the priority; and wherein a specific service is provided through the a first wireless network, and wherein the first wireless network is determined among at least one available wireless network mapped to a specific service.

Furthermore, in this specification, the priority information is determined according to characteristics of the each service, and the characteristics include at least one of a transmission rate or latency required to provide the service.

Furthermore, in this specification, the method further comprises performing a handover procedure for handover the terminal to a target wireless network included in the at least one available wireless network mapped to the specific service, when the first wireless network is unable to provide the specific service.

Furthermore, in this specification, the method further comprises transmitting measurement configuration information for measuring channel quality of the target wireless network from to the terminal, wherein the measurement configuration information including at least one of a channel parameters related to the at least one available wireless networks for handover.

Furthermore, in this specification, the step of performing a handover procedure further comprises receiving a measured channel quality of the target wireless network, transmitting a handover request message requesting handover of the terminal to the target wireless network, and receiving a handover response message in response to the handover request message from the target wireless network.

Furthermore, in this specification, A terminal for providing a specific service through a wireless networks by a terminal, the terminal comprising: a radio frequency (RF) module for transmitting and receiving a radio signal with an external device; and a processor functionally connected to the RF module, wherein the processor is configured to: receive broadcasting information from a primary network or a secondary network, wherein the broadcasting information includes at least one of mapping information indicating a mapping relationship between a plurality of services and available wireless networks, configuration information of the available wireless networks or priority information of the available wireless networks mapped to each of the plurality services, determine a first wireless network among at least one available wireless network mapped to the specific service according to the priority information, and provide the specific service through the determined first wireless network, wherein the priority information is determined according to characteristics of the each service.

Advantageous Effects

According to the present invention, data can be transmitted and received through different networks for each service by selecting a wireless network according to a service and transmitting and receiving data through the wireless network.

Further, according to the present invention, in an environment in which a plurality of networks exist, by classifying services into categories according to characteristics of a service and by mapping an available wireless network to each category, an optimal wireless network for providing each service can be mapped to the each service.

Further, according to the present invention, by setting a priority of wireless networks mapped to each category service and by providing a service through a wireless network according to a preset priority, a service can be provided through a most appropriate wireless network.

Further, according to the present invention, when a wireless network can no longer provide a service, by performing handover to available another wireless network, a service can be provided through the another wireless network without service interruption.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 is a block diagram showing an example of wireless protocol architecture to which a technical characteristic of the present invention may be applied.

FIG. 4 is a diagram illustrating an example of a handover procedure to which the present invention may be applied.

FIG. 5 is a diagram illustrating an example of connection between a UE and a network suggesting in the present invention.

FIG. 6 is a flowchart illustrating an example of a method of providing a service by mapping a network according to a service suggesting in the present invention.

FIGS. 7 and 8 are diagrams illustrating an example of a handover method according to connection between a UE and a network suggesting in the present invention.

FIG. 9 is a flowchart illustrating an example of a handover method suggesting in the present invention.

FIG. 10 is a flowchart illustrating an example of a handover method according to each network suggesting in the present invention.

FIG. 11 is a flowchart illustrating an example of a method in which a terminal suggesting in the present invention provides a service through different networks according to a service.

FIG. 12 is a flowchart illustrating an example of a method in which a network suggesting in the present invention provides a service by mapping different networks according to a service.

FIG. 13 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", an "advanced mobile station (AMS)", a "wireless terminal (WT)", a machine-type communication (MTC)

device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A pro is an evolution of 3GPP LTE-A. 5G NR is a revolution of 3GPP LTE-A that will be implemented by OFDMA or its variants.

For the purpose of the present invention, the following abbreviations apply.

1×CSFB Circuit Switched Fallback to 1×RTT
ABS Almost Blank Subframe
AC Access Category
ACK Acknowledgement
ACLR Adjacent Channel Leakage Ratio
AM Acknowledged Mode
AMBR Aggregate Maximum Bit Rate
ANDSF Access Network Discovery and Selection Function
ANR Automatic Neighbour Relation
ARQ Automatic Repeat Request
ARP Allocation and Retention Priority
AS Access Stratum
BCCH Broadcast Control Channel
BCH Broadcast Channel
BL Bandwidth reduced Low complexity
BR-BCCH Bandwidth Reduced Broadcast Control Channel
BSR Buffer Status Report
C/I Carrier-to-Interference Power Ratio
CAZAC Constant Amplitude Zero Auto-Correlation
CA Carrier Aggregation
CBC Cell Broadcast Center
CC Component Carrier
CG Cell Group
CIF Carrier Indicator Field
CIoT Cellular Internet of Things
CMAS Commercial Mobile Alert Service
CMC Connection Mobility Control
CP Cyclic Prefix
CoMP Coordinated Multi Point
C-planeControl Plane
C-RNTI Cell RNTI
CQI Channel Quality Indicator
CRC Cyclic Redundancy Check
CRE Cell Range Extension
CRS Cell-specific Reference Signal
CSA Common Subframe Allocation
CSG Closed Subscriber Group
CSI Channel State Information
CSI-IMCSI interference measurement
CSI-RSCSI reference signal
DC Dual Connectivity
DCCH Dedicated Control Channel
DCN Dedicated Core Network
DeNB Donor eNB
DFTS DFT Spread OFDM
DL Downlink
DMTC Discovery Signal Measurement Timing Configuration
DRB Data Radio Bearer
DRS Discovery Reference Signal
DRX Discontinuous Reception
DTCH Dedicated Traffic Channel
DTX Discontinuous Transmission
DwPTS Downlink Pilot Time Slot
EAB Extended Access Barring
ECGI E-UTRAN Cell Global Identifier
ECM EPS Connection Management
EMM EPS Mobility Management
E-CID Enhanced Cell-ID (positioning method)
eIMTA Enhanced Interference Management and Traffic Adaptation
eHRPDenhanced High Rate Packet Data
eNB E-UTRAN NodeB
EPC Evolved Packet Core
EPDCCH Enhanced Physical Downlink Control Channel
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
GRE Generic Routing Encapsulation
G-RNTI Group RNTI
SC-N-RNTI Single Cell Notification RNTI
SC-RNTI Single Cell RNTI
GUMMEI Globally Unique MME Identifier
GUTI Globally Unique Temporary Identifier
GWCN GateWay Core Network
HARQ Hybrid ARQ
(H)eNB eNB or HeNB HO Handover
HPLMN Home Public Land Mobile Network
HRPD High Rate Packet Data
HSDPA High Speed Downlink Packet Access
H-SFN Hyper System Frame Number
ICIC Inter-Cell Interference Coordination
IDC In-Device Coexistence
IP Internet Protocol
ISM Industrial, Scientific and Medical
KPAS Korean Public Alert System
LAA Licensed-Assisted Access
LB Load Balancing
LBT Listen Before Talk
LCG Logical Channel Group
LCR Low Chip Rate
LCS LoCation Service
LIPA Local IP Access
LHN Local Home Network
LHN ID Local Home Network ID
LMU Location Measurement Unit
LPPa LTE Positioning Protocol Annex
L-GW Local Gateway
LTE Long Term Evolution
LWA LTE-WLAN Aggregation
LWAAP LTE-WLAN Aggregation Adaptation Protocol
LWIP LTE WLAN Radio Level Integration with IPsec Tunnel
LWIP-SeGW LWIP Security Gateway
MAC Medium Access Control
MBMS Multimedia Broadcast Multicast Service
MBR Maximum Bit Rate
MBSFN Multimedia Broadcast multicast service Single Frequency Network
MCCH Multicast Control Channel
MCE Multi-cell/multicast Coordination Entity
MCG Master Cell Group
MCH Multicast Channel
MCS Modulation and Coding Scheme
MDT Minimization of Drive Tests
MeNB Master eNB
MGW Media Gateway
MIB Master Information Block
MIMO Multiple Input Multiple Output
MME Mobility Management Entity
MMTEL Multimedia telephony
MPDCCH MTC Physical Downlink Control Channel
MSA MCH Subframe Allocation
MSI MCH Scheduling Information
MSP MCH Scheduling Period
MTC Machine-Type Communications
MTCH Multicast Traffic Channel
NACK Negative Acknowledgement
NAS Non-Access Stratum
NB-IoT Narrow Band Internet of Things
NPBCH Narrowband Physical Broadcast channel
NCC Next Hop Chaining Counter
NH Next Hop key
NNSF NAS Node Selection Function
NPDCCH Narrowband Physical Downlink Control channel
NPDSCH Narrowband Physical Downlink Shared channel
NPRACH Narrowband Physical Random Access channel
NPUSCH Narrowband Physical Uplink Shared channel
NPRS Narrowband Positioning Reference Signal
NPSS Narrowband Primary Synchronization Signal
NR Neighbour cell Relation
NRT Neighbour Relation Table
NSSS Narrowband Secondary Synchronization Signal
OFDM Orthogonal Frequency Division Multiplexing
OFDMA Orthogonal Frequency Division Multiple Access
OPI Offload Preference Indicator
OTDOA Observed Time Difference Of Arrival (positioning method)
P-GW PDN Gateway
P-RNTI Paging RNTI
PA Power Amplifier
PAPR Peak-to-Average Power Ratio
PBCH Physical Broadcast CHannel
PBR Prioritised Bit Rate
PCC Primary Component Carrier
PCCH Paging Control Channel
PCell Primary Cell
PCFICH Physical Control Format Indicator CHannel
PCH Paging Channel
PCI Physical Cell Identifier
PDCCH Physical Downlink Control CHannel
PDCP Packet Data Convergence Protocol
PDN Packet Data Network
PDSCH Physical Downlink Shared CHannel
PDU Protocol Data Unit
PHICH Physical Hybrid ARQ Indicator CHannel
PHY Physical layer
PLMN Public Land Mobile Network
PMCH Physical Multicast CHannel
PMK Pairwise Master Key
PPPP ProSe Per-Packet Priority
PRACH Physical Random Access CHannel
PRB Physical Resource Block
ProSe Proximity based Services
PSBCH Physical Sidelink Broadcast CHannel
PSC Packet Scheduling
PSCCH Physical Sidelink Control CHannel
PSCell Primary SCell
PSDCH Physical Sidelink Discovery CHannel
PSK Pre-Shared Key
PSM Power Saving Mode
PSSCH Physical Sidelink Shared CHannel
pTAG Primary Timing Advance Group
PTW Paging Time Window
PUCCH Physical Uplink Control CHannel
PUSCH Physical Uplink Shared CHannel
PWS Public Warning System
QAM Quadrature Amplitude Modulation
QCI QoS Class Identifier
QoS Quality of Service
R-PDCCH Relay Physical Downlink Control CHannel
RA-RNTI Random Access RNTI
RAC Radio Admission Control
RACH Random Access Channel
RAT Radio Access Technology
RB Radio Bearer
RBC Radio Bearer Control
RCLWI RAN Controlled LTE-WLAN Interworking
RF Radio Frequency
RIBS Radio-interface based synchronization
RIM RAN Information Management
RLC Radio Link Control
RN Relay Node
RNC Radio Network Controller
RNL Radio Network Layer
RNTI Radio Network Temporary Identifier
RMTC RSSI Measurement Timing Configuration
ROHC Robust Header Compression RRC Radio Resource Control
RRM Radio Resource Management
RU Resource Unit
S-GW Serving Gateway
S-RSRP Sidelink Reference Signal Received Power
S1-MME S1 for the control plane
SCC Secondary Component Carrier
SCell Secondary Cell
SCG Secondary Cell Group
SD-RSRP Sidelink Discovery Reference Signal Received Power
SeNB Secondary eNB
SI System Information
SIB System Information Block
SIPTO Selected IP Traffic Offload
SIPTO@LN Selected IP Traffic Offload at the Local Network
SI-RNTI System Information RNTI
S1-U S1 for the user plane
SAE System Architecture Evolution
SAP Service Access Point
SC-FDMA Single Carrier—Frequency Division Multiple Access
SCH Synchronization Channel
SC-MCCH Single Cell Multicast Control Channel
SC-MTCH Single Cell Multicast Transport Channel
SC-PTM Single Cell Point To Multiploint
SCTP Stream Control Transmission Protocol
SDF Service Data Flow
SDMA Spatial Division Multiple Access
SDU Service Data Unit
SeGW Security Gateway
SFN System Frame Number
S-GW Serving GateWay
SBCCH Sidelink Broadcast Control Channel
SL-BCH Sidelink Broadcast Channel
SL-DCH Sidelink Discovery Channel
SL-RNTI Sidelink RNTI
SL-SCH Sidelink Shared Channel
STCH Sidelink Traffic Channel
SPID Subscriber Profile ID for RAT/Frequency Priority
SR Scheduling Request
SRB Signalling Radio Bearer
SU Scheduling Unit
sTAG Secondary Timing Advance Group
TA Tracking Area
TAG Timing Advance Group
TB Transport Block
TCP Transmission Control Protocol
TDD Time Division Duplex
TDM Time Division Multiplexing
TEID Tunnel Endpoint Identifier
TFT Traffic Flow Template
TM Transparent Mode
TMGI Temporary Mobile Group Identity
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
UpPTS Uplink Pilot Time Slot
V2I Vehicle-to-Infrastructure
V2N Vehicle-to-Network
V2P Vehicle-to-Pedestrian
V2V Vehicle-to-Vehicle
V2X Vehicle-to-Everything
VRB Virtual Resource Block
WLAN Wireless Local Area Network
WT WLAN Termination
X2 GWX2 GateWay
X2-C X2-Control plane
X2-U X2-User plane
Xw-C Xw-Control plane
Xw-U Xw-User plane For the purposes of the present invention, the following terms and definitions apply.

Access Control: the process that checks whether a UE is allowed to access and to be granted services in a closed cell.

Anchor carrier: in NB-IoT, a carrier where the UE assumes that NPSS/NSSS/NPBCH/SIB-NB are transmitted.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Control plane CIoT EPS optimization: Enables support of efficient transport of user data (IP, non-IP or SMS) over control plane via the MME without triggering data radio bearer establishment, as defined in TS 24.301. In the context of this specification, a NB-IoT UE that only supports Control plane CIoT EPS optimization is a UE that does not support User plane CIoT EPS optimization and S1-U data transfer but may support other CIoT EPS optimizations.

CSG Cell: a cell broadcasting a CSG indicator set to true and a specific CSG identity.

CSG ID Validation: the process that checks whether the CSG ID received via handover messages is the same as the one broadcast by the target E-UTRAN.

CSG member cell: a cell broadcasting the identity of the selected PLMN, registered PLMN or equivalent PLMN and for which the CSG whitelist of the UE includes an entry comprising cell's CSG ID and the respective PLMN identity.

DCN-ID: DCN identity identifies a specific dedicated core network (DCN).

Dual Connectivity: mode of operation of a UE in RRC CONNECTED, configured with a Master Cell Group and a Secondary Cell Group.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC CONNECTED.

Hybrid cell: a cell broadcasting a CSG indicator set to false and a specific CSG identity. This cell is accessible as a CSG cell by UEs which are members of the CSG and as a normal cell by all other UEs.

Local Home Network: as defined in TS 23.401.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU: in LTE-WLAN Aggregation, a PDU with DRB ID generated by LWAAP entity for transmission over WLAN.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MBMS-dedicated cell: cell dedicated to MBMS transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG bearer: in dual connectivity, a bearer whose radio protocols are only located in the MeNB to use MeNB resources only.

Membership Verification: the process that checks whether a UE is a member or non-member of a hybrid cell.

NB-IoT: NB-IoT allows access to network services via E-UTRA with a channel bandwidth limited to 180 kHz.

NB-IoT UE: a UE that uses NB-IoT.

Non-anchor carrier: in NB-IoT, a carrier where the UE does not assume that NPSS/NSSS/NPBCH/SIB-NB are transmitted.

PLMN ID Check: the process that checks whether a PLMN ID is the RPLMN identity or an EPLMN identity of the UE.

Power saving mode: mode configured and controlled by NAS that allows the UE to reduce its power consumption, as defined in TS 24.301, TS 23.401, TS 23.682.

Primary PUCCH group: a group of serving cells including PCell whose PUCCH signalling is associated with the PUCCH on PCell.

Primary Timing Advance Group: Timing Advance Group containing the PCell. In this specification, Primary Timing Advance Group refers also to Timing Advance Group containing the PSCell unless explicitly stated otherwise.

ProSe-enabled Public Safety UE: a UE that the HPLMN has configured to be authorized for Public Safety use, and which is ProSe-enabled and supports ProSe procedures and capabilities specific to Public Safety. The UE may, but need not, have a USIM with one of the special access classes {12, 13, 14}.

ProSe Per-Packet Priority: a scalar value associated with a protocol data unit that defines the priority handling to be applied for transmission of that protocol data unit.

ProSe UE-to-Network Relay: a UE that provides functionality to support connectivity to the network for Remote UE(s).

ProSe UE-to-Network Relay Selection: Process of identifying a potential ProSe UE-to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be used for connectivity services (e.g. to communicate with PDN).

Public Safety ProSe Carrier: carrier frequency for public safety sidelink communication and public safety sidelink discovery.

PUCCH group: either primary PUCCH group or a secondary PUCCH group.

PUCCH SCell: a Secondary Cell configured with PUCCH.

RACH-less HO/SeNB change: skipping random access procedure during handover or change of SeNB.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Sidelink: UE to UE interface for sidelink communication, V2X sidelink communication and sidelink discovery. The Sidelink corresponds to the PC5 interface as defined in TS 23.303.

Sidelink Control period: period over which resources are allocated in a cell for sidelink control information and sidelink data transmissions. The Sidelink Control period corresponds to the PSCCH period as defined in TS 36.213.

Sidelink communication: AS functionality enabling ProSe Direct Communication as defined in TS 23.303, between two or more nearby UEs, using E-UTRA technology but not traversing any network node. In this version, the terminology "sidelink communication" without "V2X" prefix only concerns PS unless specifically stated otherwise.

Sidelink discovery: AS functionality enabling ProSe Direct Discovery as defined in TS 23.303, using E-UTRA technology but not traversing any network node.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

User plane CIoT EPS optimization: Enables support for change from EMM-IDLE mode to EMM-CONNECTED mode without the need for using the Service Request procedure, as defined in TS 24.301.

V2X sidelink communication: AS functionality enabling V2X Communication as defined in TS 23.285, between nearby UEs, using E-UTRA technology but not traversing any network node.

WLAN Termination: the logical node that terminates the Xw interface on the WLAN side.

FIG. 1 is a view illustrating an Evolved Packet System which is associated with the Long Term Evolution (LTE) system to which the present invention may be applied.

The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, Terminology used in this specification is defined as follows.

CMAS: Commercial Mobile Alert System
ETWS: Earthquake Tsunami Warning System
PWS: Public Warning System
WEA: Wireless Emergency Alert
PSAP: Public Safety Answering Point
Commercial Mobile Alert System: Public Warning System that delivers Warning Notifications provided by Warning Notification Providers to CMAS capable PWS-UEs. CMAS defines three different classes of Warning Notifications (Presidential, Imminent Threat and Child Abduction Emergency)
Earthquake and Tsunami Warning System: Public Warning System that delivers Warning Notifications specific to Earthquake and Tsunami provided by Warning Notification Providers to the UEs which have the capability of receiving Primary and Secondary Warning Notifications within Notification Areas through the 3GPP network
Notification Area: area where Warning Notifications are broadcast. This is an area that closely approximates the geographical information provided by the Warning Notification Provider
PWS-UE: User Equipment (UE) which has the capability of receiving Warning Notifications within Notification Areas through the 3GPP network and conforms to the behaviour specific to the PWS service such as dedicated alerting indication and display of the Warning Notification upon reception FIG. 3 is a block diagram showing an example of wireless protocol architecture to which a technical characteristic of the present invention may be applied.

FIG. 3(a) shows an example of wireless protocol architecture for a user plane, and FIG. 3(b) is a block diagram showing an example of wireless protocol architecture for a control plane.

The user plane is a protocol stack for user data transmission, and the control plane is a protocol stack for control signal transmission.

Referring to FIGS. 3(a) and 3(b), a physical (PHY) layer provides an information transfer service to a higher layer using a physical channel. The PHY layer is connected to a medium access control (MAC) layer, that is, a higher layer, through a transport channel. Data can be transferred between the MAC layer and the PHY layer through the transport channel. The transport channel is divided depending on how data is transferred based on what characteristic through a radio interface.

Data is moved through a physical channel between different PHY layers, that is, between the PHY layers of a transmitter and a receiver. The physical channel may be modulated according to an orthogonal frequency division multiplexing (OFDM) scheme and uses time and a frequency as radio resources.

The function of the MAC layer includes mapping between a logical channel and the transport channel and multiplexing/demultiplexing (the meaning of "/" includes both the concepts of "or" and "and") as a transport block provided to the physical channel on the transport channel of a MAC service data unit (SDU) belongs to the logical channel. The MAC layer provides services to a radio link control (RLC) layer through the logical channel.

The function of the RLC layer includes the connection, segmentation and reassembly of an RLC SDU. In order to guarantee various quality of services (QoS) required by a radio bearer (RB), the RLC layer provides three operation modes: a transparent mode (TM), an unacknowledged mode (UM) and an acknowledged mode (AM). The AM RLC provides error correction through an automatic repeat request (ARQ).

A radio resource control (RRC) layer is defined only in the control plane. The RRC layer is related to the configuration, re-configuration and release of radio bears and responsible for control of the logical channel, transport channel and physical channel. An RB means a logical path provided by the first layer (PHY layer) and the second layer (the MAC layer, RLC layer or PDCP layer) in order to transfer data between a UE and a network.

The function of a packet data convergence protocol (PDCP) layer in the user plane includes the transfer, header compression and ciphering of user data. The function of the PDCP in the control plane includes the transfer and encryption/integrity protection of control plane data.

What an RB is configured means a process of defining the characteristics of a wireless protocol layer and channels in order to provide a specific service and of configuring each detailed parameter and operating method. An RB may be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of a UE and the RRC layer of an E-UTRAN, the UE is in the RRC connected state. If not, the UE is in an RRC idle state.

A downlink transport channel through which data is transmitted from a network to a UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH, or may be transmitted through an additional downlink multicast channel (MCH). Meanwhile, an uplink transport channel through which data is transmitted from a UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

FIG. 4 is a diagram illustrating an example of a handover procedure to which the present invention may be applied.

The preparation and execution phase of the Handover procedure is performed without EPC involvement, i.e. preparation messages are directly exchanged between the eNBs. The release of the resources at the source side during the Handover completion phase is triggered by the eNB. In case an RN is involved, its DeNB relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality. FIG. 4 shows the basic handover scenario in which the MME or serving gateway is not changed.

Specifically, 0. The UE context within the source eNB contains information regarding roaming and access restrictions which were provided either at connection establishment or at the last TA update.

1. The source eNB configures the UE measurement procedures according to the roaming and access restriction information and e.g. the available multiple frequency band information. Measurements provided by the source eNB may assist the function controlling the UE's connection mobility.

2. A MEASUREMENT REPORT is triggered and sent to the eNB.

3. The source eNB makes decision based on MEASUREMENT REPORT and RRM information to hand off the UE.

4. The source eNB issues a HANDOVER REQUEST message to the target eNB passing necessary information to prepare the Handover at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.

5. Admission Control may be performed by the target eNB dependent on the received E-RAB QoS information to increase the likelihood of a successful Handover, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB prepares Handover with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. If RACH-less HO is configured, the container includes timing adjustment indication and optionally a preallocated uplink grant. The HANDOVER REQUEST ACKNOWLEDGE message may also include RNL/TNL information for the forwarding tunnels, if necessary.

Steps 7 to 16 provide means to avoid data loss during Handover.

7. The target eNB generates the RRC message to perform the handover, i.e. RRCConnectionReconfiguration message including the mobilityControlInformation, to be sent by the source eNB towards the UE. The source eNB performs the necessary integrity protection and ciphering of the message.

The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. If RACH-less HO is configured, the RRCConnectionReconfiguration includes timing adjustment indication and optionally preallocated uplink grant for accessing the target eNB. If preallocated uplink grant is not included, the UE should monitor PDCCH of the target eNB to receive an uplink grant. The UE does not need to delay the handover execution for delivering the HARQ/ARQ responses to source eNB.

If Make-Before-Break HO is configured, the connection to the source cell is maintained after the reception of RRCConnectionReconfiguration message with mobilityControlInformation before the UE executes initial uplink transmission to the target cell.

8. The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. If RACH-less HO is not configured, after receiving the RRCConnectionReconfiguration message including the mobilityControlInformation, UE performs synchronisation to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

If RACH-less Handover is configured, UE performs synchronisation to target eNB. UE derives target eNB specific keys and configures the selected security algorithms to be used in the target cell.

10. If RACH-less HO is not configured, the target eNB responds with UL allocation and timing advance.

10a If RACH-less HO is configured and the UE did not get the periodic pre-allocated uplink grant in the RRCConnectionReconfiguration message including the mobilityControlInfo, the UE receives uplink grant via the PDCCH of the target cell. The UE uses the first available uplink grant after synchronization to the target cell.

11. When the UE has successfully accessed the target cell or received uplink grant when RACH-less HO is configured, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12. The target eNB sends a PATH SWITCH REQUEST message to MME to inform that the UE has changed cell.

13. The MME sends a MODIFY BEARER REQUEST message to the Serving Gateway.

14. The Serving Gateway switches the downlink data path to the target side. The Serving gateway sends one or more "end marker" packets on the old path to the source eNB and then can release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18. Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

Tremendous increase of mobile data traffics has been witnessed due to proliferation of advanced wireless networks, e.g., LTE and LTE-Advanced networks and smart devices, e.g., smart phones, and tablets. New services and applications will be kept being introduced based on those successful technological achievements, thus there is no doubt that the trend in mobile traffic increase will require major breakthroughs in near future.

Mobile networks are categorized and classified in terms of numerical generations. For example, mobile broadband services were introduced using 3rd generation (3G) networks, e.g., high-speed packet access (HSPA), and major adoption by customers was possible due to 4th generation (4G) networks, e.g., long-term evolution (LTE) and long-term evolution-advanced (LTE-Advanced), and will be much evolved by 5th generation (5G) networks being actively discussed now.

Recent major research and development (R&D) efforts are being focused on the implementation of 5th generation wireless systems aiming to provide enhanced mobile broadband services, ultra-reliable and critical communications, and to accommodate massive machine type communications (MTC) devices.

Mere provision of big data pipes for mobile traffic will waste valuable resources, e.g., spectrum and power.

In this invention, we propose method to utilize the resources more efficiently by considering the traffic characteristics and geographical location information when multitude of wireless technologies are available, e.g., LTE/LTE-Advanced, Wi-Fi/LAA-LTE, 5G, Bluetooth, and so on.

Hereinafter, in the present invention, it is assumed that one provider manages a plurality of wireless networks.

FIG. 5 is a diagram illustrating an example of connection between a UE and a network suggesting in the present invention.

Referring to FIG. 5, the UE may support a plurality of wireless networks, and a network that controls the UE and a network that can transmit and receive data for providing a service may separately exist.

Specifically, a UE 10 may support a plurality of wireless networks (e.g., 3G, HSPA, LTE, LTE-A, Wi-Fi, and 5G) and include a network interface for connecting to each wireless network. The UE may form connection for data transmission and reception and the control to one network through a wireless network interface or may anchor to a network for the control and form connection to another wireless network to transmit and receive data.

For example, as shown in FIG. 5 (a), the UE 10 may form connection to a primary wireless network through a first network interface. In this case, both a control plane for the control of the UE and a user plane for data transmission and reception may be formed in the primary wireless network. In an exemplary embodiment described with reference to FIG. 5(a), the UE 10 may receive control information for the control of the UE from the primary wireless network.

Alternatively, as shown in FIG. 5(b), the UE 10 may form connection to the primary wireless network through a first network interface and form connection to the secondary wireless network through a second network interface. In this case, the UE may anchor to the primary wireless network for the control and form a connection for data transmission and reception in the secondary wireless network. That is, the UE 10 may form a control plane for the control in the primary wireless network and form a user plane for data transmission and reception in the secondary wireless network. In an exemplary embodiment described with reference to FIG. 5(b), the UE 10 may receive control information for the control of the terminal from the secondary wireless network as well as the primary wireless network.

In this way, a plurality of networks exist, and when the UE 10 supports a plurality of networks, the UE 10 may provide a service through each of different wireless networks according to a service kind.

Specifically, each service and application requires different handling. For example, when a video is downloading, high-speed broadband connection is desirable while the requirement on latency can be much relaxed. This can be supported using high-speed carrier Wi-Fi (Wi-Fi hot spots managed by carrier) if available instead of using long term evolution (LTE) and LTE-Advanced networks. It will be prominent when aforementioned service is invoked in busy shopping mall where many other customers enjoy other services using the same LTE and LTE-Advanced network.

As the introduction of wireless technologies are getting matured, the chance of being covered more than one wireless technology over geographical areas is getting higher and even desirable (known as "network densification"). One example embodiment is that a busy shopping mall is covered by LTE/LTE-Advanced network, Wi-Fi/license-assisted access (LAA)-LTE networks, and/or 5G hotspots. When many customers use the services provided by LTE/LTE-Advanced networks, it is not a good decision to accommodate massive video downloading services into the LTE/LTE-Advanced networks from operator's perspective. In this situation, limited capacity in LTE/LTE-Advanced networks can efficient utilized by diverting massive video downloading traffic to Wi-Fi/LAA-LTE networks.

In this invention, we propose method for efficient network utilization by considering service/application characteristics, multitude of available wireless networks, traffic load, geographical location, and/or time of the day.

FIG. 6 is a flowchart illustrating an example of a method of providing a service by mapping a network according to a service suggesting in the present invention.

Referring to FIG. 6, at least one available wireless network is mapped to each service in consideration of a service and a state of a wireless network, and a priority of the mapped at least one wireless network is set.

The terminal may select one network according to a priority among the mapped at least one wireless network and provide a service through the selected wireless network.

Hereinafter, in the present invention, a primary wireless network and a secondary wireless network may mean a wireless network for wireless communication of the terminal, such as 3G, HSPA, LTE, LTE-A, Wi-Fi, and 5G.

Further, the terminal may mean smart devices and MTC devices.

Specifically, the primary wireless network classifies services that can provide into categories according to each characteristic. That is, the primary wireless network classifies services having the same characteristic or a similar characteristic into one category according to a data transmission rate, delay, and reliability required by services.

The primary wireless network maps at least one available wireless network to services classified into categories or each service based on characteristics of services classified into categories, a location, a traffic load, and a time and sets (or determines) a priority of the mapped at least one wireless network (S6010).

Table 1 represents an example of wireless networks mapped to a service.

Table 1 is an example of a mapping relation between a service/application and a network, and in Table 1, a mapping relation between many service(s)/application(s) and a network may exist.

Thereafter, the primary wireless network periodically and/or aperiodically broadcasts broadcast information including mapping information and priority information (S6020).

In this case, broadcast information may have the following characteristics.

The broadcast information can be cell-specific, set of cells-specific, or/and system-wide.

The broadcast information is system information. For example, For LTE/LTE-Advanced, this broadcast information can be transmitted using a new or existing system information block (SIB) transmission The broadcast information maps the services/applications with available wireless networks in terms of geographical location, traffic load over the wireless networks in that location, and etc.

The broadcast information contains the prioritized list of wireless networks per services/applications.

The broadcast information can be changed based on the location, the traffic load, and/or the time of the day.

The broadcast information can contain other wireless network configuration information. For example, when the broadcast information is transmitted using LTE/LTE-Advanced networks, the configuration information includes carrier Wi-Fi information such as ESSID (Extended Service Set Identification), BSSID (Base Service Set Identification), band information (e.g., 2.4 GHz, 5 GHz, or 60 GHz), channel information (e.g., channels 2 and 3 in 60 GHz), security information for authentication and association, etc.

The broadcast information may specify more than one wireless networks for a certain service/application. For

TABLE 1

| | Characteristics | | |
|---|---|---|---|
| Services/Applications | Transmission Rate | Latency | Prioritized Network Mappings |
| Video Downloading | Very High | Tolerant | $1^{st}$: 5 G networks<br>$2^{nd}$: Wi-Fi/LAA-LTE networks<br>$3^{rd}$: : LTE/LTE-Advanced networks |
| Internet Browsing | Medium-to-High | Somewhat Intolerant | $1^{st}$: LTE/LTE-Advanced networks<br>$2^{nd}$: Wi-Fi/LAA-LTE networks<br>$3^{rd}$: : 5 G networks |
| Social Networking | Low-to-Medium | Somewhat Intolerant | $1^{st}$: LTE/LTE-Advanced networks<br>$2^{nd}$: Wi-Fi/LAA-LTE networks<br>$3^{rd}$: : 5 G networks |
| Packet Voice | Low | Intolerant | $1^{st}$: Wi-Fi/LAA-LTE networks<br>$2^{nd}$: LTE/LTE-Advanced networks<br>$3^{rd}$: : 5 G networks |
| Virtual Presence | Very High | Intolerant | $1^{st}$: 5 G networks<br>$2^{nd}$: LTE/LTE-Advanced networks<br>$3^{rd}$: : Wi-Fi/LAA-LTE networks |
| Mobile Gaming | Very High | Intolerant | $1^{st}$: 5 G networks<br>$2^{nd}$: LTE/LTE-Advanced networks<br>$3^{rd}$: : Wi-Fi/LAA-LTE networks |

Table 1 represents an example of mapping of a service/application to the available wireless network. Mapping between a service and an available network may be changed according to a geographical location, traffic load being experienced, and/or time of the day.

For example, the 1st priority wireless network for video downloading can be LTE/LTE-Advanced networks when no other wireless networks available and/or traffic load in LTE/LTE-Advanced networks are not high.

example, for video downloading, LTE-Advanced+Wi-Fi/LAA-LTE may be mapped.

Radio access network is shared by public safety authority when necessary. In certain situation, e.g., public safety situation, this broadcast information can be enforced as mandatory for all classes of smart devices, e.g., smart phones, tablet PC, etc., regardless of subscription class. In this situation, the broadcast information transmission is event-driven.

In this situation, certain service(s)/application(s) may have "NULL" mapping of wireless networks. "NULL" mapping of the wireless network to the service(s)/application(s) indicates that the service(s)/application(s) is disabled.

Even though certain service(s)/application(s) have the mapping of the wireless networks, not all UE class may be accessible. For example, only public safety UE may have the right to access the service(s)/application(s) such as packet voice, multimedia SMS, etc.

In a specific situation, when a wireless network mapped to service(s)/application(s) is "NULL", if the specific situation is released, a radio access network broadcasts a message notifying subscribed terminals that the specific situation has been released. When receiving a message notifying that the specific situation has been released, the terminals may provide service(s)/application(s) using the wireless network mapped before mapping to "NULL".

Alternatively, if a specific situation is released, the radio access network includes mapping information representing a wireless network mapped to the service(s)/application(s) and priority information representing a priority of the mapped wireless networks in broadcast information and broadcast the broadcast information to the terminals. The terminals may receive broadcast information after the specific situation, and when wireless networks mapped to service(s)/application(s) exist, the terminals may recognize that the specific situation has been released and use the mapped wireless networks.

That is, when wireless networks blocked due to occurrence of a specific situation are enabled by broadcast information transmitted later, the terminal may recognize that the specific situation has been released and use the enabled wireless network.

In another situation (ex. data traffic overload situation) certain class and below of smart devices and/or of subscriptions can be enforced as mandatory regardless of sharing or not sharing with public safety authority.

The subscriptions may have different privileges. For example, high subscription class (ex. platinum subscription class, etc) may have priority over the low subscription class (ex. bronze subscription class, etc) when the data traffic overload situation happens so that certain service(s)/application(s) are allowed to access for high class subscribers while not allowed for low class subscribers.

The terminal monitors and processes periodic and/or aperiodic broadcast information on the mappings of services/applications with available wireless networks (S6030).

By periodically or aperiodically monitoring and processing broadcast information transmitted from the primary wireless network, the terminal may recognize wireless networks available for providing each service and a priority of the available wireless networks.

Further, as described above, when an available wireless network and a priority of a service are changed due to the reason of the location, the traffic load, and/or the time of the day, the terminal may recognize a changed wireless network and a priority through broadcast information transmitted after the change.

Thereafter, when a specific service/application is invoked, the terminal determines a secondary wireless network for a specific service based on broadcast information received from the primary wireless network (S6040).

Specifically, the terminal determines a secondary wireless network for providing a specific service or receives an input from the user according to mapping information and priority information included in broadcast information received from the primary wireless network.

When the terminal directly determines a secondary wireless network, the terminal determines a network having a highest priority among available networks mapped to a specific service to a secondary wireless network.

When the terminal receives an input of a secondary wireless network from the user, the terminal outputs at least one available network mapped to the specific service/application together with a priority through the output unit.

That is, the terminal may request selection of a wireless network to be used for the specific service/application to the user and recommend a specific wireless network according to a priority of the wireless network. For example, the terminal may recommend a Carrier Wi-Fi network as a wireless network to be used for a video downloading service.

The terminal receives an input of one network among at least one available network from the user and determines a network selected by the user to a secondary wireless network.

When the secondary wireless network selected by the user or a priority is "OFF", the terminal may activate the secondary wireless network selected to perform connection and authentication using configuration information included in broadcast information.

Thereafter, the terminal may make connection using the activated secondary wireless network and configuration information included in broadcast information and provide a specific service through the secondary wireless network (S6050).

When a specific situation has occurred (e.g., public safety situation), the terminal may output through the output unit and notify the user that the specific service/application cannot be used. In this situation, the mapping of service(s)/application(s) with wireless networks can be mandatorily enforced.

Through such a method, by mapping networks according to a requiring condition of each service, setting a priority, and providing a service, a service may be efficiently provided.

Further, by previously acquiring configuration information for connection and authentication of the wireless network, connection and authentication to the selected wireless network may be quickly performed.

FIGS. 7 and 8 are diagrams illustrating an example of a handover method according to connection between a UE and a network suggesting in the present invention.

Referring to FIGS. 7 and 8, the UE may perform handover to a network that performs a control function as well as a network for data transmission and reception according to a connected network form.

FIG. 7 represents an example of handover when the UE 10 makes connection to a network, as shown in FIG. 5(*a*), and FIG. 8 represents an example of handover when the UE 10 makes connection to a network, as shown in FIG. 5(*b*).

Specifically, when the service(s)/applications(s) is no more supported by current wireless network assigned, e.g., due to mobility, the handover procedure may be initiated by current wireless network (node) to the target wireless network providing the coverage and the next level of priority.

For example, when a user is getting out of carrier Wi-Fi coverage while downloading the video, the LTE/LTE-Advanced network or carrier Wi-Fi network initiates handover procedure based on the measurement report(s) by the UE. Hence, seamless service provisioning is guaranteed.

As shown in FIG. 7, when the UE 10 forms both a control plane for the control and a user plane for data transmission and reception with the primary wireless network, (a) the UE 10 may perform handover only a user plane for data transmission and reception from the primary wireless network to a target wireless network.

Alternatively, in (b) the UE 10 may perform handover both the control plane for the control and the user plane for data transmission and reception from the primary wireless network to the target wireless network.

Unlike FIG. 7, as shown in FIG. 8, when the UE 10 forms a control plane for the control with the primary wireless network and forms a user plane for data transmission and reception with the secondary wireless network, (a) the UE 10 may perform handover only a user plane for data transmission and reception from the secondary wireless network to the target wireless network.

Alternatively, in (b) the UE 10 may perform handover both the primary wireless network and the secondary wireless network to the target wireless network.

When performing handover of FIGS. 7 and 8, the UE 10 may select a target wireless network to perform handover based on mapping information and priority information included in broadcast information described with reference to FIG. 6.

In this case, the target wireless network may be selected using the same method as a method of determining the secondary wireless network described at step S6030 of FIG. 6.

That is, the UE may select a wireless network having a highest priority among available wireless networks mapped to a specific service or may receive an input of one wireless network and select the wireless network among available wireless networks mapped to a specific service from the user.

When the wireless network may no longer provide a specific service by a movement of the terminal through such a method, the UE may continue to provide a specific service through handover to another wireless network.

FIG. 9 is a flowchart illustrating an example of a handover method suggesting in and implementable by the present invention.

Referring to FIG. 9, when a wireless network that has provided a specific service can no longer provide a specific service, the terminal may perform handover to another wireless network to continue to provide the specific service.

In this case, as described with reference to FIGS. 7 and 8, the following two handover cases may exist according to whether one wireless network performs the entire of a control function of the terminal and transmission and reception of user data.

First, when a control function and transmission and reception of user data are performed through the same wireless network, the source wireless network (which is providing user plane for the UE) may contact to the target wireless network for handover. The source wireless network is providing both user plane and control plane.

For example, if the source wireless network is carrier Wi-Fi and the terminal is getting out of carrier Wi-Fi coverage while downloading a video content, the terminal reports the quality of the carrier Wi-Fi with/without the list of available wireless networks for video downloading to the carrier Wi-Fi. Then the carrier Wi-Fi should select, based on the UE report, a wireless network out of the list (this is called "target wireless network"), and contact the target wireless network to check handover possibility.

Second, when a control function and transmission and reception of user data are performed through different wireless networks, the primary wireless network responsible for control plane for the terminal (if the architecture is defined to use a default wireless network for control plane) for mobility may contact to the target wireless network for handover. The primary wireless network is providing control plane and the secondary wireless network is providing user plane.

For example, if the secondary wireless network has the list of wireless networks based on the service(s)/application(s), the terminal does not need to provide the list of available wireless networks for video downloading.

If the secondary wireless network is Carrier Wi-Fi and the primary wireless network is LTE/LTE-Advanced network, Carrier Wi-Fi may transfer the report to LTE/LTE-Advanced network for handover decision if LTE/LTE-Advanced network has control right over carrier Wi-Fi network. LTE/LTE-A network contacts a target wireless network to check the availability of handover. Hence, seamless service provisioning is guaranteed.

Specifically, a source network transmits measurement configuration information to the terminal for measuring the source network and at least one available wireless network (S9010). The measurement configuration information includes at least one parameter that the terminal should measure.

The terminal periodically or aperiodically measures the source network and at least one available wireless network based on the measurement configuration information received from the source network and transmits the measured value to the source network (S9020).

Thereafter, when the measured value (e.g., signal intensity) of the source network is equal to or smaller than a predetermined value for a certain duration of time, the terminal may determine that the source network can no longer provide the specific service(s)/application(s) and perform handover to another wireless network.

Specifically, when the specific service(s)/applications(s) is no more supported by the source wireless network (still supported but is expected to be out of the radio coverage area), e.g., due to mobility (e.g., move out of the radio coverage of that wireless network out of all feasible wireless networks for that the terminal), the handover procedure may be initiated by the UE.

The terminal transmits to the source network a list of the wireless networks to perform the handover based on the measured value (e.g., Channel quality) and the specific service(s)/application(s)(S9030).

When the source network has a list of wireless networks based on service(s)/application(s), the terminal may not transmit the list of wireless networks to the source network for possible handover.

Thereafter, the source network determines whether to perform handover based on a measurement value of the source network transmitted from the terminal and determines a target wireless network to perform handover based on the list of wireless networks and a measurement value of at least one available wireless network (S9040).

The source network may transmit a handover request message that requests handover of the terminal to the determined target wireless network (S9050) and receive a handover response message from the target wireless network in response to a handover request message to perform handover (S9060).

FIG. 10 is a flowchart illustrating an example of a handover method according to each network suggesting in the present invention.

Referring to FIG. 10, when a source network can no longer provide a specific service, a UE may perform handover to another wireless network mapped to the specific service to continue to provide the specific service.

Hereinafter, a source network and a target wireless network in the present invention means a network supporting wireless communication such as 3G, LTE, LTE-A, 5G, Wi-Fi, or etc.

Specifically, 0. The UE context within the source network contains information regarding roaming and access restrictions which were provided either at connection establishment or at the last TA update.

1. The source network configures the UE measurement procedures according to the roaming and access restriction information and e.g. the available multiple frequency band information. Measurements provided by the source network may assist the function controlling the UE's connection mobility.

2. A MEASUREMENT REPORT is triggered and sent to the source network. The MEASUREMENT REPORT may include the measured values of the source network and the available wireless networks and the list of available wireless networks for a specific service, which are illustrated in FIG. 10.

3. The source network makes decision based on MEASUREMENT REPORT and RRM information to hand off the UE.

4. The source network issues a HANDOVER REQUEST message to the target wireless network passing necessary information to prepare the Handover at the target side (UE X2 signalling context reference at source network, UE S1 EPC signalling context reference, target cell ID, source network key, RRC context including the C-RNTI of the UE in the source network, AS-configuration, E-RAB context and physical layer ID of the source cell+short MAC-I for possible RLF recovery). UE X2/UE S1 signalling references enable the target wireless network to address the source network and the EPC. The E-RAB context includes necessary RNL and TNL addressing information, and QoS profiles of the E-RABs.

5. Admission Control may be performed by the target wireless network dependent on the received E-RAB QoS information to increase the likelihood of a successful Handover, if the resources can be granted by target wireless network. The target wireless network configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target wireless network prepares Handover with L1/L2 and sends the HANDOVER REQUEST ACKNOWLEDGE to the source network. The HANDOVER REQUEST ACKNOWLEDGE message includes a transparent container to be sent to the UE as an RRC message to perform the handover. The container includes a new C-RNTI, target wireless network security algorithm identifiers for the selected security algorithms, may include a dedicated RACH preamble, and possibly some other parameters i.e. access parameters, SIBs, etc. If RACH-less HO is configured, the container includes timing adjustment indication and optionally a preallocated uplink grant. The HANDOVER REQUEST ACKNOWLEDGE message may also include RNL/TNL information for the forwarding tunnels, if necessary.

Steps 7 to 16 provide means to avoid data loss during Handover.

7. The target wireless network generates the RRC message to perform the handover, i.e. RRCConnectionReconfiguration message including the mobilityControlInformation, to be sent by the source network towards the UE. The source network performs the necessary integrity protection and ciphering of the message.

The UE receives the RRCConnectionReconfiguration message with necessary parameters (i.e. new C-RNTI, target wireless network security algorithm identifiers, and optionally dedicated RACH preamble, target wireless network SIBs, etc.) and is commanded by the source network to perform the HO. If RACH-less HO is configured, the RRCConnectionReconfiguration includes timing adjustment indication and optionally preallocated uplink grant for accessing the target wireless network. If preallocated uplink grant is not included, the UE should monitor channel of the target wireless network to receive an uplink grant. The UE does not need to delay the handover execution for delivering the HARQ/ARQ responses to source network.

If Make-Before-Break HO is configured, the connection to the source network is maintained after the reception of RRCConnectionReconfiguration message with mobilityControlInformation before the UE executes initial uplink transmission to the target wireless network.

8. The source network sends the SN STATUS TRANSFER message to the target wireless network to convey the uplink PDCP SN (Packet Data Convergence Protocol Sequence Number) receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target wireless network shall assign to new SDUs, not having a PDCP SN yet. The source network may omit sending this message if none of the E-RABs of the UE shall be treated with PDCP status preservation.

9. If RACH-less HO is not configured, after receiving the RRCConnectionReconfiguration message including the mobilityControlInformation, UE performs synchronisation to target wireless network and accesses the target cell via RACH, following a contention-free procedure if a dedicated RACH preamble was indicated in the mobilityControlInformation, or following a contention-based procedure if no dedicated preamble was indicated. UE derives target wireless network specific keys and configures the selected security algorithms to be used in the target cell.

If RACH-less Handover is configured, UE performs synchronisation to target wireless network. UE derives target wireless network specific keys and configures the selected security algorithms to be used in the target cell.

10. If RACH-less HO is not configured, the target wireless network responds with UL allocation and timing advance.

10a If RACH-less HO is configured and the UE did not get the periodic pre-allocated uplink grant in the RRCConnectionReconfiguration message including the mobilityControlInfo, the UE receives uplink grant via the PDCCH of the target cell. The UE uses the first available uplink grant after synchronization to the target cell.

11. When the UE has successfully accessed the target cell or received uplink grant when RACH-less HO is configured, the UE sends the RRCConnectionReconfigurationComplete message (C-RNTI) to confirm the handover, along with an uplink Buffer Status Report, whenever possible, to the target wireless network to indicate that the handover procedure is completed for the UE. The target wireless network verifies the C-RNTI sent in the RRCConnectionReconfigurationComplete message. The target wireless network can now begin sending data to the UE.

12. The target wireless network sends a PATH SWITCH REQUEST message to MME to inform that the UE has changed cell.

13. The MME sends a MODIFY BEARER REQUEST message to the Serving Gateway.

14. The Serving Gateway switches the downlink data path to the target side. The Serving gateway sends one or more "end marker" packets on the old path to the source network and then can release any U-plane/TNL resources towards the source network.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By sending the UE CONTEXT RELEASE message, the target wireless network informs success of HO to source network and triggers the release of resources by the source network. The target wireless network sends this message after the PATH SWITCH REQUEST ACKNOWLEDGE message is received from the MME.

18. Upon reception of the UE CONTEXT RELEASE message, the source network can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

FIG. 11 is a flowchart illustrating an example of a method in which a terminal suggesting in the present invention provides a service through different networks according to a service.

Referring to FIG. 11, by mapping available different wireless networks according to characteristics of a service, a location, data traffic, a traffic load, and a time, the terminal may receive a service through an optimal wireless network.

Specifically, the terminal monitors and receives broadcast information periodically or aperiodically transmitted from the primary wireless network and processes the received broadcast information (S11010).

The broadcast information is periodically or aperiodically transmitted from the primary wireless network and may include mapping information, priority information, and configuration information for connection of wireless networks described with reference to FIG. 6.

In this case, the priority information may be set based on characteristics of each service, a geographical location of the terminal, traffic load being experienced, and/or time of the day.

By processing the received broadcast information, the terminal may recognize available wireless networks mapped to each service and a priority of the mapped available wireless networks.

Thereafter, when a specific service is invoked, the terminal selects one of available wireless networks mapped to the specific service (S11020). In this case, the terminal may select a wireless network having a highest priority among available wireless networks mapped to a specific service or may receive an input from the user to select the wireless network, as described with reference to FIG. 6.

The terminal may perform connection and authentication procedures to the selected wireless network using configuration information and provide a specific service through the selected wireless network (S11030).

FIG. 12 is a flowchart illustrating an example of a method in which a network suggesting in the present invention provides a service by mapping different networks according to the service.

Referring to FIG. 12, the wireless network may map available different wireless networks and set a priority of the mapped wireless networks according to characteristics of each service, a geographical location, data traffic, a traffic load, and a time.

Specifically, the wireless network may map available wireless networks to each service and set a priority of the mapped wireless networks according to characteristics of a service, a geographical location of a terminal, traffic load being experienced, and/or time of the day (S12010).

In this case, in a specific situation such as a public safety situation, the wireless network may map a value of a wireless network mapped to the service to a "Null" value and may be set to use only a specific service.

Further, available wireless networks mapped to the service may be differently set on a terminal basis according to a subscriber class of the terminal. For example, in a terminal having a high subscriber class, a wireless network mapped to a service in a specific situation may exist, but in a terminal having a low subscriber class, a wireless network mapped to a service may not exist.

Thereafter, the wireless network may periodically or aperiodically broadcast broadcast information (S12020). As shown in FIG. 6, the broadcast information may include mapping information, priority information, and configuration information for connecting wireless networks.

Further, because the broadcast information is encoded, only terminals subscribed to the wireless network may process the broadcast information.

Each service may be provided through selected one network among mapped wireless networks.

FIG. 13 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 13, the network entity 1310 and the UE (or the vehicle UE) 1320 include communication units (transmitting/receiving units, RF units, 1313 and 1323), processors 1311 and 1321, and memories 1312 and 1322.

The network entity and the UE may further input units and output units.

The communication units 1313 and 1323, the processors 1311 and 1321, the input units, the output units, and the memories 1312 and 1322 are operatively connected with each other in order to conduct the methods as proposed herein.

The communication units (transmitting/receiving units or RF units, 1313 and 1323), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1311 and 1321 implement functions, procedures, and/or methods as proposed herein. The layers of radio interface protocols may be implemented by the processors.

The processors may be represented as control parts, controllers, control units, or computers.

The memories 1312 and 1322 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

INDUSTRIAL APPLICABILITY

Examples in which the method for transmitting and receiving data using an LTE-WLAN aggregation by a terminal in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for providing a specific service through wireless networks by a terminal, the method comprising:

receiving broadcasting information from a primary network or a secondary network, wherein the broadcasting information includes mapping information indicating a mapping relationship between a plurality of services and available wireless networks, configuration information of the available wireless networks and priority information of the available wireless networks mapped to each of the plurality of services;

determining a first wireless network among at least one available wireless network mapped to the specific service according to the priority information; and providing the specific service through the determined first wireless network, wherein the priority information is determined according to characteristics of each of the plurality of services including transmission rate, reliability and latency required to provide the specific service, wherein the broadcasting information is changed according to a location of the terminal, a traffic load of the at least one available wireless network and time, wherein, based on the broadcasting information being transmitted according to a pre-configured event, a part of the plurality of services has the mapping relationship with the available wireless networks and a rest of the plurality of services is mapped to NULL, wherein, based on the specific service being one of the part of the plurality of services, the specific service is provided based on that the terminal has a right related to the pre-configured event, and wherein, based on the specific service being one of the rest of the plurality of services, the specific service is provided based on that the broadcasting information is retransmitted in association with a release of the pre-configured event.

2. The method of claim 1, further comprising:

performing a handover to a target wireless network included in the at least one available wireless network, when the first wireless network is unable to provide the specific service.

3. The method of claim 2, further comprising:

receiving measurement configuration information for measuring channel quality of the target wireless network from the first wireless network, wherein the measurement configuration information includes at least one of a channel parameters related to the at least one available wireless networks for handover.

4. The method of claim 3, wherein the step of performing a handover further comprises:

measuring channel quality of the target wireless network; and reporting the measured channel quality to the first wireless network.

5. The method of claim 1, wherein the primary network performs a function of controlling the terminal.

6. A method for providing a specific service through wireless networks by a source network, the method comprising, setting a priority of available wireless networks mapped to each of a plurality of services; and transmitting broadcasting information to a terminal, wherein the broadcasting information includes mapping information indicating a mapping relationship between the plurality of services and the available wireless networks, configuration information of the available wireless networks and priority information indicating the priority, wherein a specific service is provided through the first wireless network, wherein the first wireless network is determined among at least one available wireless network mapped to a specific service, wherein the priority information is determined according to characteristics of each of the plurality of services including transmission rate, reliability and latency required to provide the specific service, wherein the broadcasting information is changed according to a location of the terminal, a traffic load of the at least one available wireless network and time, wherein, based on the broadcasting information being transmitted according to a pre-configured event, a part of the plurality of services has the mapping relationship with the available wireless networks and a rest of the plurality of services is mapped to NULL, wherein, based on the specific service being one of the part of the plurality of services, the specific service is provided based on that the terminal has a right related to the pre-configured event, and wherein, based on the specific service being one of the rest of the plurality of services, the specific service is provided based on that the broadcasting information is retransmitted in association with a release of the pre-configured event.

7. The method of claim 6, further comprising:
performing a handover procedure for handover the terminal to a target wireless network included in the at least one available wireless network mapped to the specific service, when the first wireless network is unable to provide the specific service.

8. The method of claim 7, further comprising:
transmitting measurement configuration information for measuring channel quality of the target wireless network to the terminal,
wherein the measurement configuration information including at least one of a channel parameters related to the at least one available wireless networks for handover.

9. The method of claim 8, wherein the step of performing a handover procedure further comprises:
receiving a measured channel quality of the target wireless network;
transmitting a handover request message requesting handover of the terminal to the target wireless network; and
receiving a handover response message in response to the handover request message from the target wireless network.

10. A terminal for providing a specific service through wireless networks, the terminal comprising:
a radio frequency (RF) module for transmitting and receiving a radio signal with an external device; and
a processor functionally connected to the RF module,
wherein the processor is configured to:
receive broadcasting information from a primary network or a secondary network,
wherein the broadcasting information includes mapping information indicating a mapping relationship between a plurality of services and available wireless networks, configuration information of the available wireless networks and priority information of the available wireless networks mapped to each of the plurality services,
determine a first wireless network among at least one available wireless network mapped to the specific service according to the priority information, and
provide the specific service through the determined first wireless network,
wherein the priority information is determined according to characteristics of each of the plurality of services including transmission rate, reliability and latency required to provide the specific service,
wherein the broadcasting information is changed according to a location of the terminal, a traffic load of the at least one available wireless network and time,
wherein, based on the broadcasting information being transmitted according to a pre-configured event, a part of the plurality of services has the mapping relationship with the available wireless networks and a rest of the plurality of services is mapped to NULL,
wherein, based on the specific service being one of the part of the plurality of services, the specific service is provided based on that the terminal has a right related to the pre-configured event, and
wherein, based on the specific service being one of the rest of the plurality of services, the specific service is provided based on that the broadcasting information is retransmitted in association with a release of the pre-configured event.

* * * * *